United States Patent
Kasai et al.

(10) Patent No.: US 9,541,380 B2
(45) Date of Patent: Jan. 10, 2017

(54) SHAPE MEASURING METHOD AND DEVICE

(71) Applicant: HITACHI, LTD., Chiyoda-ku, Tokyo (JP)

(72) Inventors: Hiroaki Kasai, Tokyo (JP); Tatsuo Hariyama, Tokyo (JP); Masahiro Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/433,000

(22) PCT Filed: Oct. 2, 2013

(86) PCT No.: PCT/JP2013/076759
§ 371 (c)(1),
(2) Date: Apr. 1, 2015

(87) PCT Pub. No.: WO2014/054666
PCT Pub. Date: Apr. 10, 2014

(65) Prior Publication Data
US 2015/0241206 A1    Aug. 27, 2015

(30) Foreign Application Priority Data
Oct. 4, 2012    (JP) .................................. 2012-221808

(51) Int. Cl.
*G01B 11/02*    (2006.01)
*G01B 11/14*    (2006.01)
(Continued)

(52) U.S. Cl.
CPC .............. *G01B 11/14* (2013.01); *G01B 11/12* (2013.01); *G01B 11/24* (2013.01);
(Continued)

(58) Field of Classification Search
CPC ... G01B 9/02; G01B 11/2441; G01B 11/0675; G01B 11/303; G01N 21/9501
(Continued)

(56) References Cited

U.S. PATENT DOCUMENTS 8,561,309 B2 * 10/2013 Fujimoto ................. G01B 5/20
33/503
2005/0279950 A1 * 12/2005 Kawano ............. G01N 21/6486
250/458.1
(Continued)

FOREIGN PATENT DOCUMENTS

JP    7-260439 A    10/1995
JP    2001-082921 A    3/2001
(Continued)

OTHER PUBLICATIONS

International Search Report of International Patent Application No. PCT/JP2013/076759, Nov. 5, 2013.

*Primary Examiner* — Tarifur Chowdhury
*Assistant Examiner* — Md M Rahman
(74) *Attorney, Agent, or Firm* — Miles & Stockbridge P.C.

(57) ABSTRACT

The purpose of the present invention is to provide a shape inspection device that improves, without making the device larger, durability and measurement precision by measuring a plurality of points with a single distance sensor. The present invention provides a shape measuring device that measures the shape of an object to be measured and that comprises: a distance sensor that calculates the distance to the object to be measure by irradiating a measurement light toward the object to be measured and detecting the reflected light from the object to be measured; a separating unit that separates the measurement light from the distance sensor into a plurality of measurement light rays to be irradiated onto a plurality of measuring points; and a selecting unit that
(Continued)

selects, from the plurality of measurement light beams separated by the separating unit, the measurement light to irradiate the object to be measured.

12 Claims, 17 Drawing Sheets

(51) Int. Cl.
| | | |
|---|---|---|
| *G01B 11/12* | (2006.01) | |
| *G01B 11/24* | (2006.01) | |
| *G01C 3/08* | (2006.01) | |
| *G01S 17/08* | (2006.01) | |
| *G01S 17/42* | (2006.01) | |
| *G01S 17/88* | (2006.01) | |
| *G01S 17/89* | (2006.01) | |
| *G01S 7/481* | (2006.01) | |

(52) U.S. Cl.
CPC .......... *G01B 11/2441* (2013.01); *G01C 3/08* (2013.01); *G01S 7/4812* (2013.01); *G01S 7/4813* (2013.01); *G01S 7/4818* (2013.01); *G01S 17/08* (2013.01); *G01S 17/42* (2013.01); *G01S 17/88* (2013.01); *G01S 17/89* (2013.01)

(58) Field of Classification Search
USPC ........................................................ 356/511
See application file for complete search history.

(56) References Cited

U.S. PATENT DOCUMENTS

| | | | |
|---|---|---|---|
| 2008/0080864 A1 | 4/2008 | Bai | |
| 2009/0168075 A1* | 7/2009 | Yamazoe | G01B 11/2441 356/511 |
| 2010/0171963 A1* | 7/2010 | Lee | G01B 11/2441 356/610 |
| 2010/0265517 A1* | 10/2010 | You | G01B 11/2441 356/511 |
| 2010/0271616 A1* | 10/2010 | Suzuki | G01B 11/24 356/5.01 |
| 2011/0279822 A1 | 11/2011 | Kannaka et al. | |
| 2013/0003040 A1* | 1/2013 | Yoshino | G01S 7/4865 356/5.01 |
| 2013/0094853 A1* | 4/2013 | Mizutani | H04J 14/02 398/34 |
| 2013/0212749 A1* | 8/2013 | Watanabe | G21K 7/00 850/4 |

FOREIGN PATENT DOCUMENTS

| | | |
|---|---|---|
| JP | 2004-347425 A | 12/2004 |
| JP | 2007-024646 A | 2/2007 |
| JP | 2008-304407 A | 12/2008 |
| JP | 2009-522608 A | 6/2009 |
| JP | 2011-145194 A | 7/2011 |
| JP | 2011-196899 A | 10/2011 |
| JP | 2013-113696 A | 6/2013 |

\* cited by examiner

SHAPE MEASURING METHOD AND DEVICE

TECHNICAL FIELD

The present invention relates to a shape measuring method and a shape measuring device.

BACKGROUND ART

In addition to quality assurance of a product during working in manufacturing, measurement of the inner surface shape of a pipe body is required in order to shorten working hours. Heretofore, there is known an inner surface shape measuring device that applies a laser beam to an inner surface of an object to be measured, and measures the inner surface shape or the inner diameter of the object to be measured from the reflected light beam.

There is JP-A-2008-304407 (PATENT LITERATURE 1) as a background art of this technical field. This literature describes "the reflection surface of a prism is fixed on the axis of a laser beam emitted from a laser displacement gauge, so that operation such as adjustment of placement of the laser displacement gauge and the prism is not necessary, and an inner diameter D can be measured by simple operation, even in a case where an object to be measured is changed, or the shape of an inner peripheral surface to be measured is changed. Additionally, the reflection surface of the prism is disposed so as to protrude from a supporting body, and therefore even in a case where the diameter of the inner peripheral surface of the object to be measured is small, and the whole of a measuring unit cannot be guided in the inner peripheral surface, the inner diameter of the inner peripheral surface can be measured by guiding of the reflection surface of the prism".

Additionally, there is JP-A-2011-196899 (PATENT LITERATURE 2). This literature describes "laser displacement sensors each including a light-emitting unit that emits a laser beam toward the inside of a pipe body in the axial direction of the pipe body, and a light-receiving unit that receives a reflected light beam returning from the inside of the pipe body are mounted at three places in the peripheral direction on the proximal end side of an arm whose distal end side is inserted in the pipe body, prisms, each of which changes, toward the inner diameter surface of the pipe body of the outside at a right angle, the direction of the laser beam emitted from each light-emitting unit, and changes, toward the proximal end side of the arm, the direction of a part of the reflected light beam on the inner diameter surface of the pipe body of the laser beam directed to the outside, are mounted in the peripheral directions identical to the peripheral directions of the respective laser displacement sensors on the distal end side of the arm, and an operating means for obtaining reflection positions of the laser beams on the inner diameter surface of the pipe body from detected values of the respective laser displacement sensors, and operating the inner diameter of the pipe body from the obtained three reflection positions is provided".

CITATION LIST

Patent Literature

PATENT LITERATURE 1: JP-A-2008-304407
PATENT LITERATURE 2: JP-A-2011-196899

SUMMARY OF INVENTION

Technical Problem

An inner diameter measuring device of PATENT LITERATURE 1 has a problem that since an inner diameter measuring device rotates to measure the inner diameter, the result depends on precision of the rotation, a problem that since a movable unit is provided, durability is low, and a problem that since discrimination between inclination of the central axis of an object to be measured and the central axis of the measuring device, and deformation of the object to be measured are not distinguishable, and adjustment is performed such that the central axes are not inclined, it is not easy to perform installation.

In an inner diameter measuring device of PATENT LITERATURE 2, distances among three points are measured by using the three displacement gauges, and the inner diameter dimension of the pipe body is operated on the basis of the sine theorem and the cosine theorem of a triangle. This inner diameter measuring device does not have a problem that the result depends on precision of the rotation, since no rotating unit is provided, does not has a problem that since movable unit is provided, durability is low, and does not has a problem that it takes time to perform measurement. In this inner diameter measuring device, the displacement gauges as many as the number of measurement places are used, and therefore the device increase in size. Additionally, the displacement gauges are further prepared in order to measure a plurality of points, and therefore it is not easy to improve inner diameter measurement precision by the measurement of the plurality of points, to measure circularity, and to measure the shape of the pipe body that is not a circle. Furthermore, there is a problem that since discrimination between inclination of the central axis of an object to be measured and the central axis of the measuring device, and deformation of the object to be measured are not distinguishable, and adjustment is performed such that the central axes are not inclined, it is not easy to perform installation.

The present invention has been made in view of the above problems, and an object of the present invention is to provide a shape inspection device that improves, without making the device larger, durability and measurement precision by measuring a plurality of points with a single distance sensor.

Solution to Problem

In order to solve the above problems, the present invention provides a shape measuring device for measuring a shape of an object to be measured, which includes: a distance sensor that applies a measurement light beam to the object to be measured, detects a reflected light beam from the object to be measured, and calculates a distance to the object to be measured; a separating unit that separates the measurement light beam from the distance sensor into a plurality of measurement light beams to be irradiated to a plurality of measuring points; and a selecting unit that selects, from the plurality of measurement light beams separated by the separating unit, a measurement light beam to be irradiated to the object to be measured.

Additionally, the present invention according to another viewpoint provides a shape measuring method which includes: separating a measurement light beam irradiated from a distance sensor into a plurality of measurement light beams; selecting any of the measurement light beams from the plurality of measurement light beams; irradiating the selected measurement light beam to a corresponding measuring point; detecting, using the distance sensor, a reflected light beam from the measuring point of each measuring point; and calculating distance from the reflected light beam to each measuring point to measure a shape of an object to be measured.

Advantageous Effects of Invention

According to the present invention, it is possible to provide a shape inspection device that improves, without making the device larger, durability by measuring a plurality of points with a single distance sensor.

Hereinafter, embodiments are described with reference to the drawings.

EMBODIMENT 1

This embodiment describes, as an example, an example of a shape measuring device for a pipe body inner surface as an object to be measured and an example of a working method for a pipe body using the shape measuring device for a pipe body inner surface.

Figure 1:
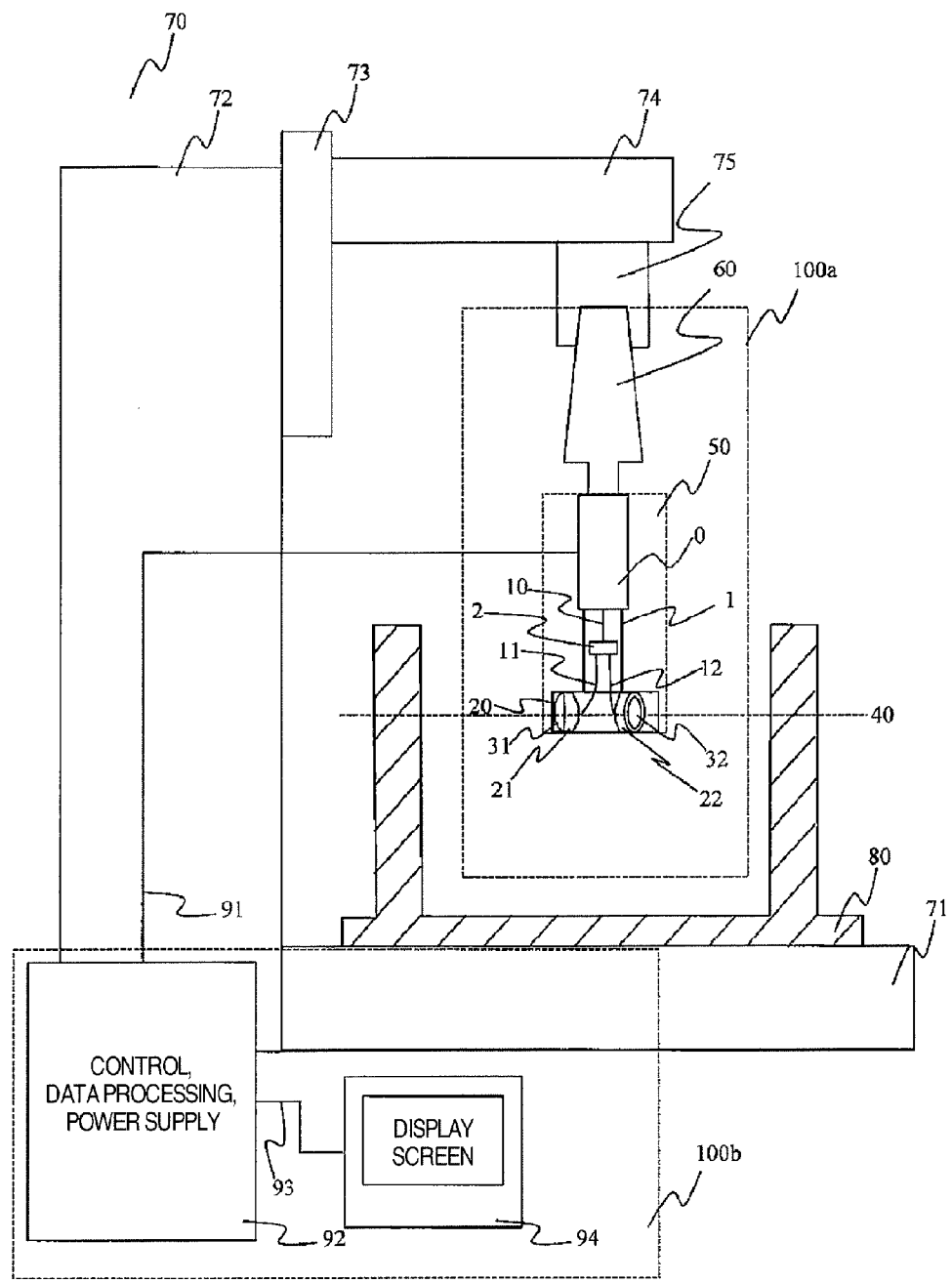
FIG. 1 is an example of a block diagram of shape measuring device 100 for a pipe body inner surface of EMBODIMENT 1.

FIG. 1 is an example of a block diagram of shape measuring device 100 for a pipe body inner surface of this embodiment.

Figure 2:
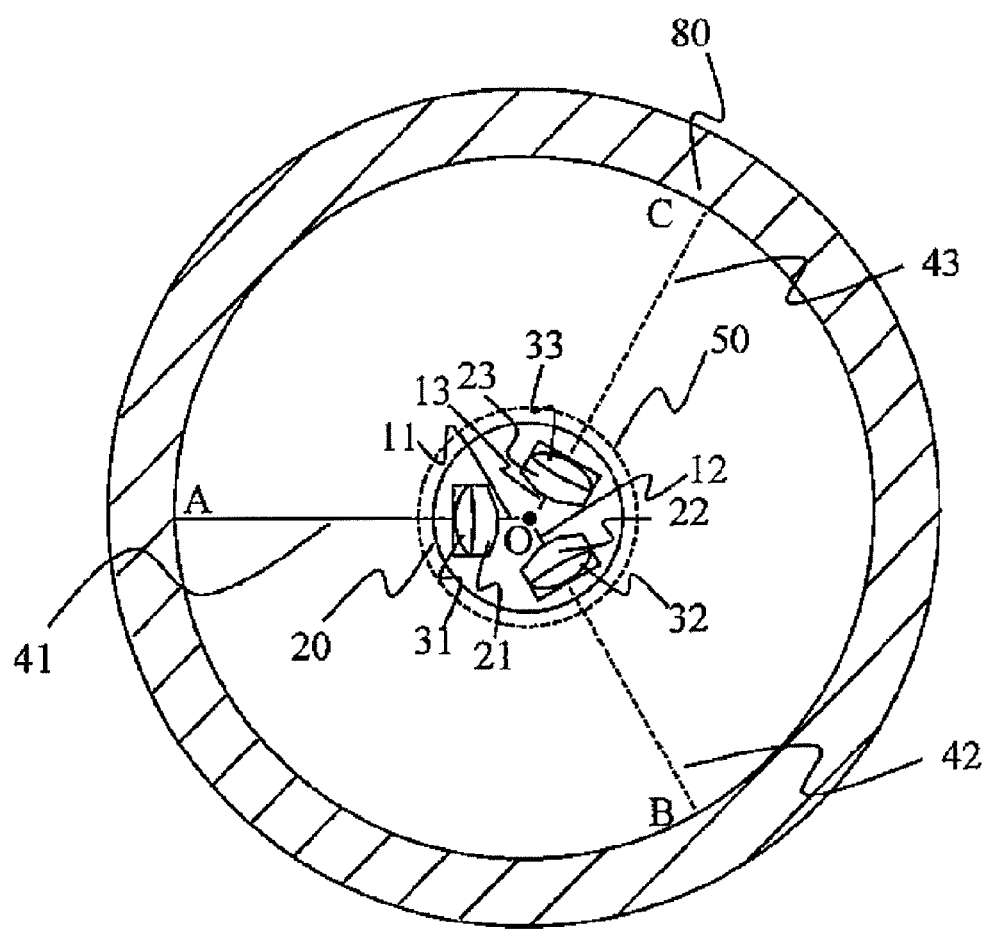
FIG. 2 is a sectional view on plan surface 40 of FIG. 1.

FIG. 2 is a sectional view on plan surface 40 of FIG. 1.

Figure 3:
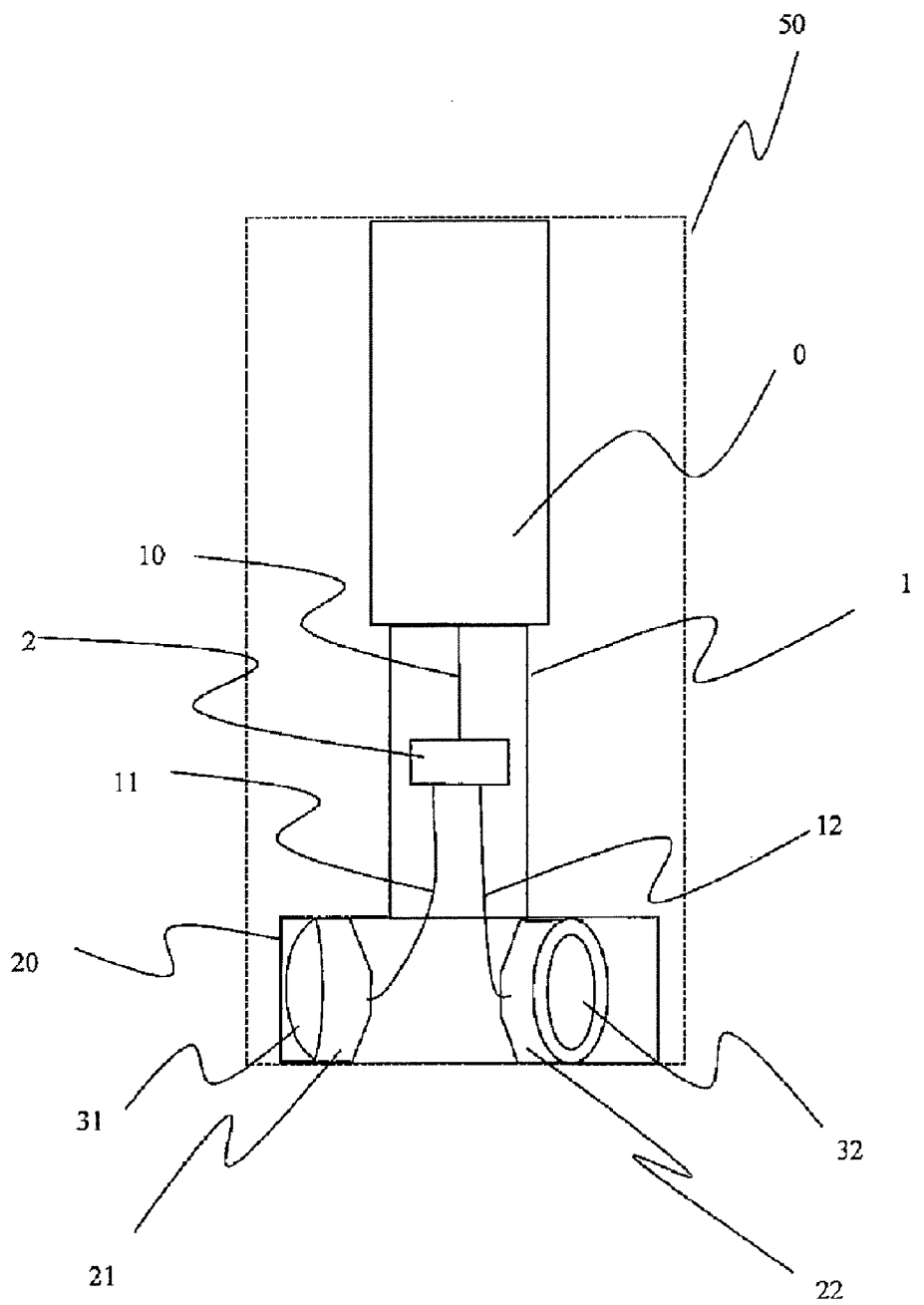
FIG. 3 is a detail view of measuring head 50.

FIG. 3 is a detail view of measuring head 50.

Figure 4:
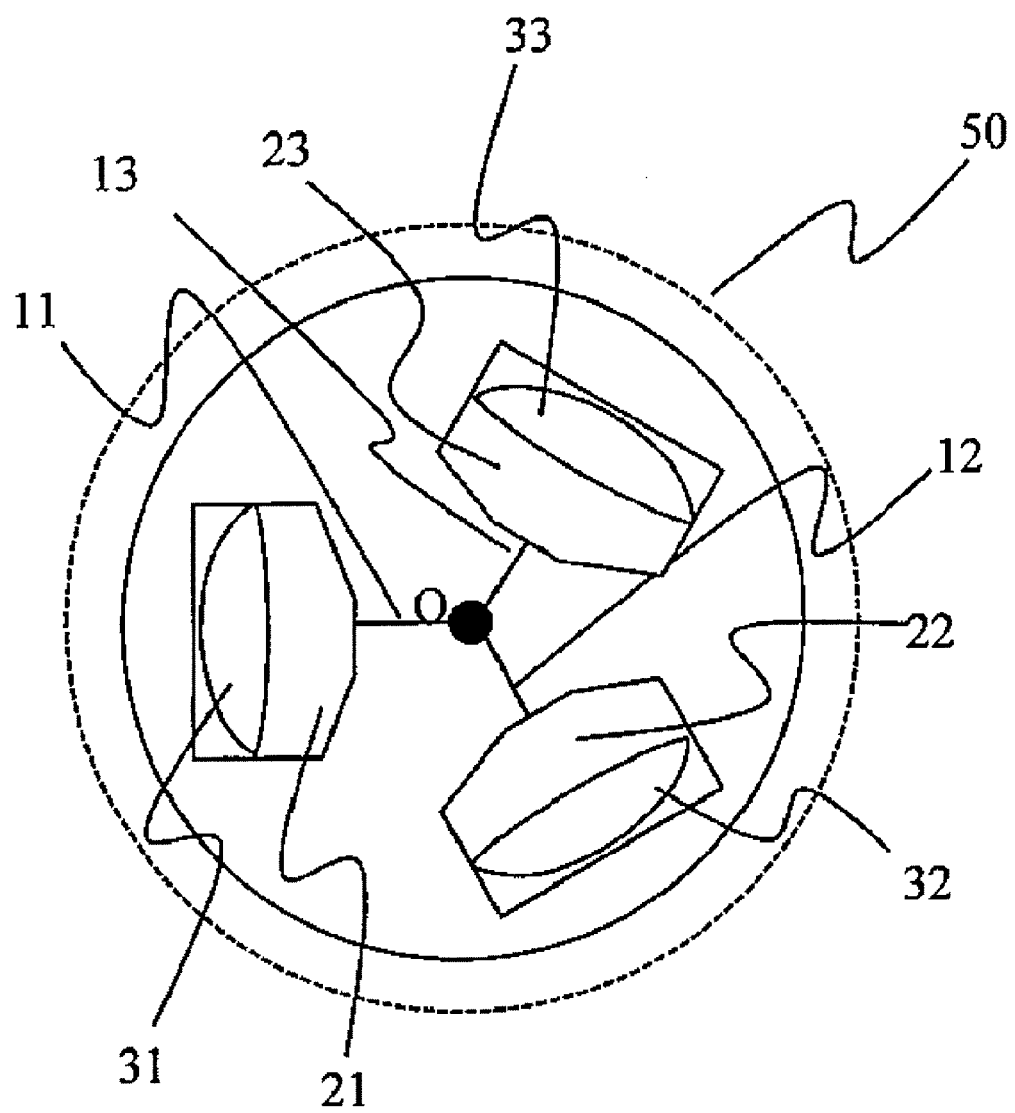
FIG. 4 is a detail view of measuring head 50 of FIG. 2.

FIG. 4 is a detail view of measuring head 50 of FIG. 2.

Shape measuring device 100 for a pipe body inner surface includes a measuring head unit 100a including measuring head 50 and adaptor 60 for connecting measuring head 50 and working machine 70, relay cable 91, and controller 100b including circuit unit 92 including controlling, data processing, and power supply circuits, and display screen 94.

Circuit unit 92 plays a role in transmitting a control signal to the measuring head, supplying power to the measuring head, recording a signal transmitted from the measuring head, and processing data, through relay cable 91. The display screen displays a measurement condition and a measurement result.

Measuring head 50 includes distance sensor 0, optical switch 2, optical fibers 10 to 13, collimator lens mounter adaptors 21 to 23, lenses 31 to 33, case 1 capable of fixing optical switch 2 and being mounted on distance sensor 0, and case 20 capable of fixing collimator lens mounter adaptors 21 to 23 and being mounted on case 1.

Distance sensor 0 applies a laser, and calculates distance from the reflected light beam. Distance sensor 0 can guide an irradiated light beam and a detected light beam by the same optical fiber. The distance measurement method is not limited. Examples of the method include a Phase-Shift method, a TOF (Time-of-Flight) method, and a FMCW (Frequency-modulated Continuous-wave) method.

Optical fiber 10 plays a role in guiding an input light beam and a detected light beam of distance sensor 0. A measurement light beam passes through a separating unit (branch point) inside optical switch 2 from optical fiber 10, and is separated into measurement light beams (respective measurement light beams that pass through the optical fibers 10 to 13) toward a plurality of measuring points.

Collimator lens mounter adaptors 21 to 23 mounted with lenses 31 to 33, each of which serves as an interference system for interfering a measurement light beam with a reflected light beam, are disposed in different directions. The center of collimator lens mounter adaptors 21 to 23 is denoted by O, and points where output light beams 41 to 43 of optical fibers 11 to 13 fall on the pipe body are denoted by A, B and C.

Figure 5:
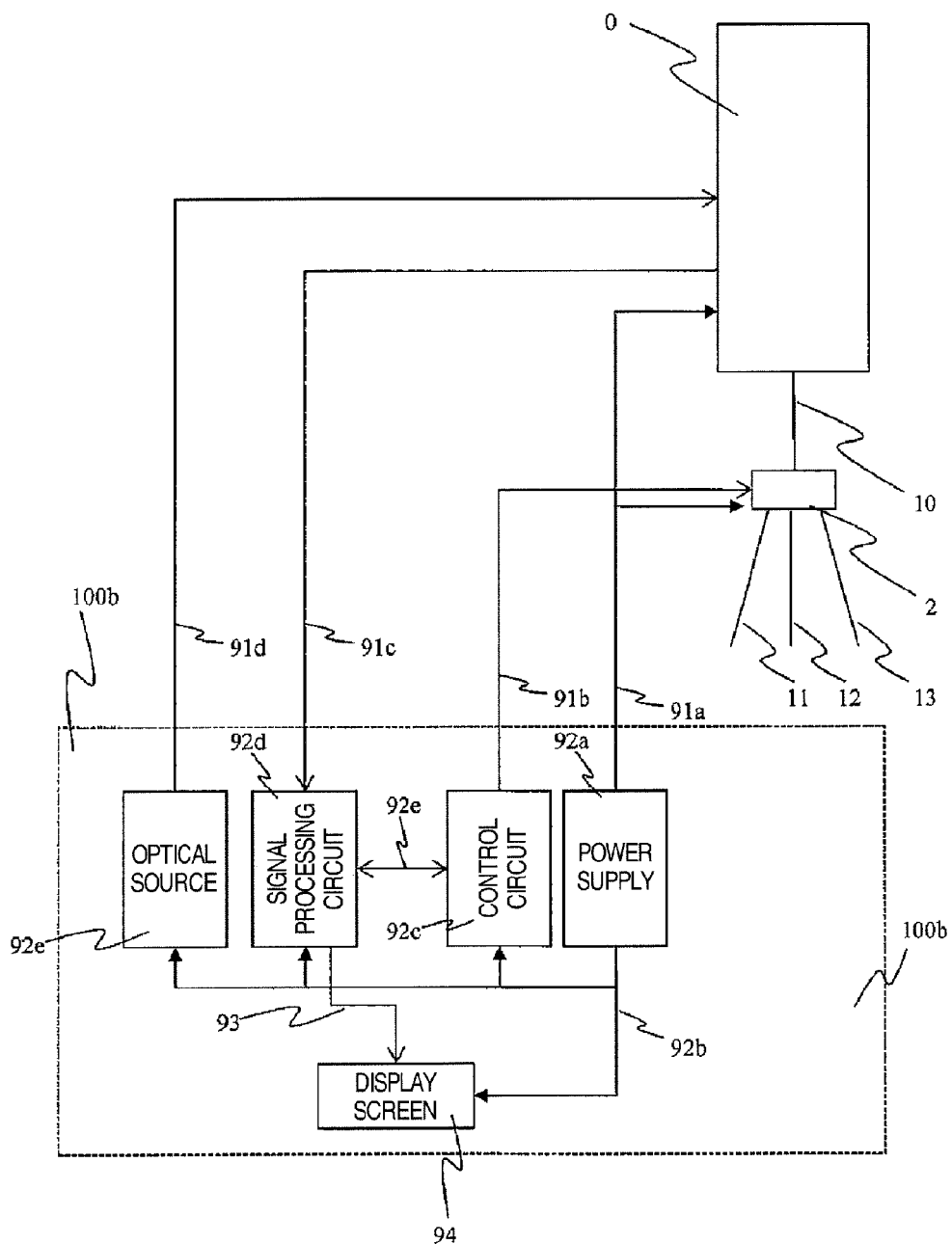
FIG. 5 is an example of a schematic diagram of a part of measuring head 50, controller 100b, and relay cable 91.

FIG. 5 is an example of a schematic diagram of a part of measuring head 50, the controller 100b, and relay cable 91. Circuit unit 92 includes power supply 92a, wiring line 92b, control circuit 92c, signal processing circuit 92d that serves as a calculating unit for calculating the shape data of the pipe body inner surface from respective measuring points calculated by distance sensor 0, and respective distances of lenses 31 to 33 serving as the interference systems, and optical source 92e, and relay cable 91 includes power supply line 91a, control line 91b, signal transmission line 91c, and transmission optical fiber 91d that transmits an optical source to distance sensor 0.

Power supply 92a plays a role in supplying power to display screen 94, control circuit 92c, signal processing circuit 92d, and optical source 92e through wiring line 92b, and supplying power to distance sensor 0 and optical switch 2 through wiring line 91a.

Control circuit 92c plays a role in transmitting a control signal to optical switch 2 through control line 91b. Optical switch 2 that serves as a selecting unit for selecting which of a plurality of measurement light beams is to be irradiated to a measuring point can select which of optical fibers 11 to 13 is connected to optical fiber 10, by an external control signal. The separating unit and the selecting unit are integrally configured as optical switch 2 in this embodiment, but may be configured to be separated.

A method of calculating distances a, b and c of OA, OB and OC is described. It is assumed that a destination of connection with optical fiber 10 selected by optical switch 2 is optical fiber 11. An output light beam from distance sensor 0 is guided to optical switch 2 by optical fiber 10. Optical switch 2 guides this light beam to optical fiber 11, and applies the light beam to the inner surface of pipe body 80 through lens 31. A reflected light beam from pipe body 80 is detected by distance sensor 0 after passes through lens 31, optical fiber 11, optical switch 2, and optical fiber 10 and is converted into an electric signal, then signal processing circuit 91d calculates the distance a of OA via signal transmission line 91c. Strictly speaking, the distance detected by distance sensor 0 is distance between a measuring point A and lens 31 serving as the interference system, but lens 31 is disposed at substantially the same position as distance sensor 0, and therefore description is made assuming that the distance of OA is detected by distance sensor 0.

Similarly, assuming that the destination of connection with optical fiber 10 selected by optical switch 2 is optical fiber 12, distance b of OB is calculated. Additionally, assuming that the destination of connection with optical fiber 10 selected by optical switch 2 is optical fiber 13, distance c of OC is calculated.

AngleAOB, AngleBOC, AngleCOA are default values, and therefore the inner diameter of the pipe body can be calculated by using a sine theorem and a cosine theorem from measurement results a, b and c.

Working machine 70 includes base 71 that fixes pipe body 80, support 72, lifting unit 73, beam 74, and attachment chuck 75. Shape measuring device 100 for a pipe body inner surface moves in the axial direction of pipe body 80 by the lifting of lifting unit 73, so that change of the inner diameter in the axial direction of the pipe body can be observed.

Shape measuring device 100 for a pipe body inner surface according to this embodiment can measure the shape of the inner surface without rotating pipe body 80 or shape measuring device 100 for a pipe body inner surface, and therefore precision is not lowered due to core deflection of rotation, and durability is excellent.

In a case where the size of pipe body 80 is largely changed, and the pipe body is not in focus, lenses 31 to 33 are replaced by lenses different in focal distance, and the focus position can match the pipe body. Additionally, focus positions of a plurality of lenses can be changed at the same time by changing lenses 31 to 33 to electric variable focus lenses, and therefore the focus position can be made to match the pipe body without replacement.

In order to perform measurement by single distance sensor 0, the number of branches of the optical switch, the number of optical fibers, the number of collimator lens adaptors, and the number of collimator lenses are increased, thereby easily increasing measuring points.

There is described an example of a working method for a pipe body using shape measuring device 100 for a pipe body inner surface according to this embodiment.

Figure 6:
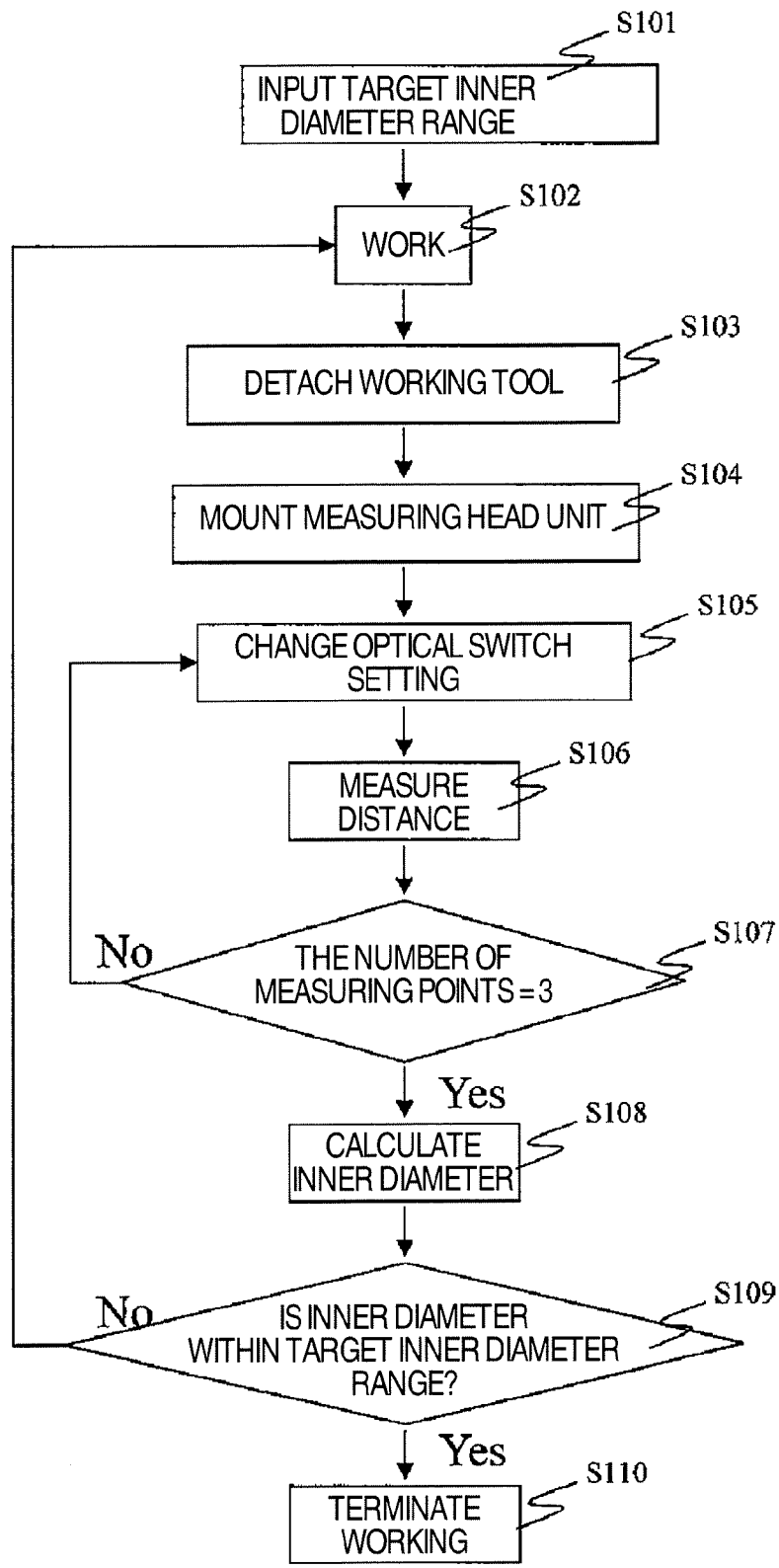
FIG. 6 shows an example of a working flow using shape measuring device 100 for a pipe body inner surface.

FIG. 6 is an example of a working flow using shape measuring device 100 for a pipe body inner surface.

A tool is previously mounted on the working machine. Pipe body 80 is fixed to base 71, a range of a target inner diameter is input (S101), working is performed (S102), the working tool is detached (S103), measuring head unit 100a is mounted (S104), the destination of connection with optical fiber 10 selected by optical switch 2 is set to any of optical fibers 11 to 13 (S105), distance is measured (S106), it is determined whether the number of measuring points is equal to three (S107), and the destination of connection with optical fiber 10 selected by optical switch 2 is set to any of optical fibers 11 to 13 that is not yet set, in a case where the number is not equal (S105).

When the number of measuring points becomes three, the inner diameter is calculated (S108), it is determined whether or not the inner diameter is within the range of the target inner diameter (S109). In a case where the inner diameter is not within the range, measuring head unit 100a is detached, and the working tool is mounted to perform working.

When the inner diameter is within the range of the target inner diameter, working is terminated (S110).

Pipe body 80 can be worked without being detached from base 71.

Figure 7:
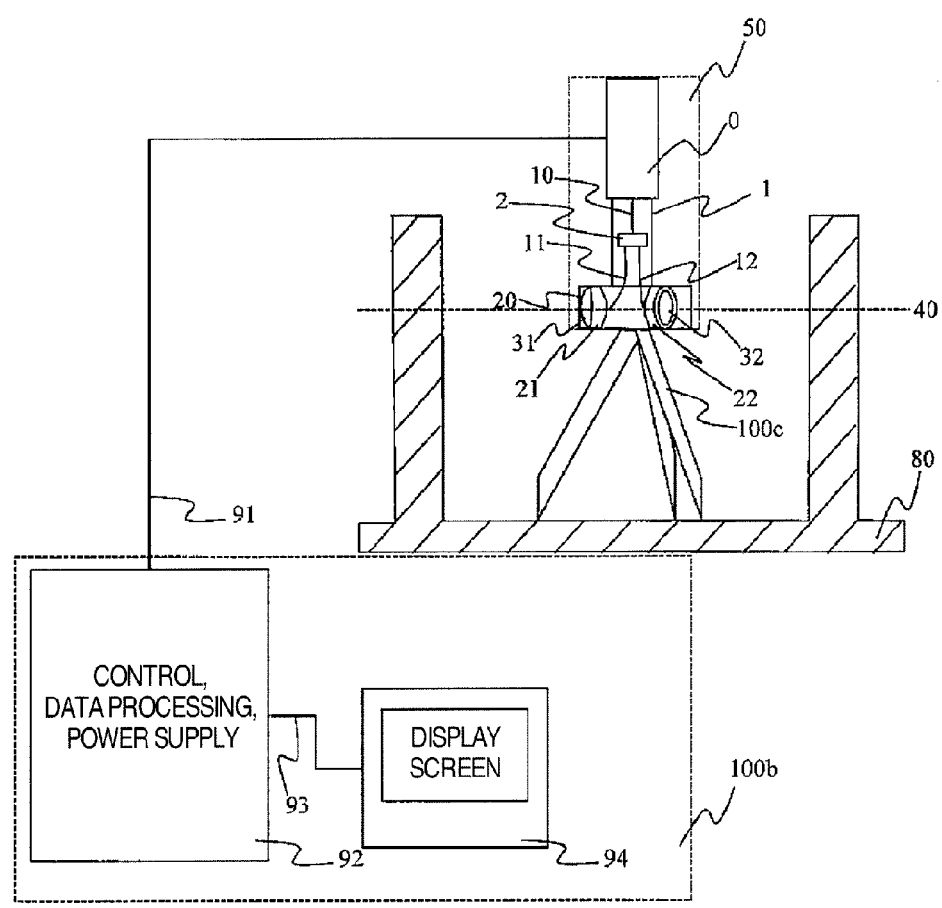
FIG. 7 shows an example of installation of measuring head 50 using a tripod 100c.

In this embodiment, the adaptor 60 for connecting measuring head 50 and working machine 70 is used in order to mount measuring head 50 on the working machine. However, as shown in FIG. 7, pipe body 80 or base 71 may be installed by using a tripod 100c to measure the shape of the pipe body inner surface.

As described above, according to this embodiment, distance sensor 0 is provided with collimator lens mounter adaptors 21 to 23 serving as separating units, and optical switch 2 serving as a selecting unit, so that single distance sensor 0 can detect distances to a plurality of measuring points without rotation of distance sensor 0. Consequently, the rotation of distance sensor 0 is not necessary, and therefore measurement precision and durability can be improved. Additionally, a plurality of the distance sensors 0 do not need to be disposed, and therefore the device can be downsized.

The distances to the three measuring points are measured, so that the inner diameter of the pipe body can be calculated.

EMBODIMENT 2

This embodiment describes an example of an inner surface shape pipe body inner surface shape measuring device for not only a pipe body having a circular sectional shape but also for a pipe body having an elliptical sectional shape.

Figure 8:
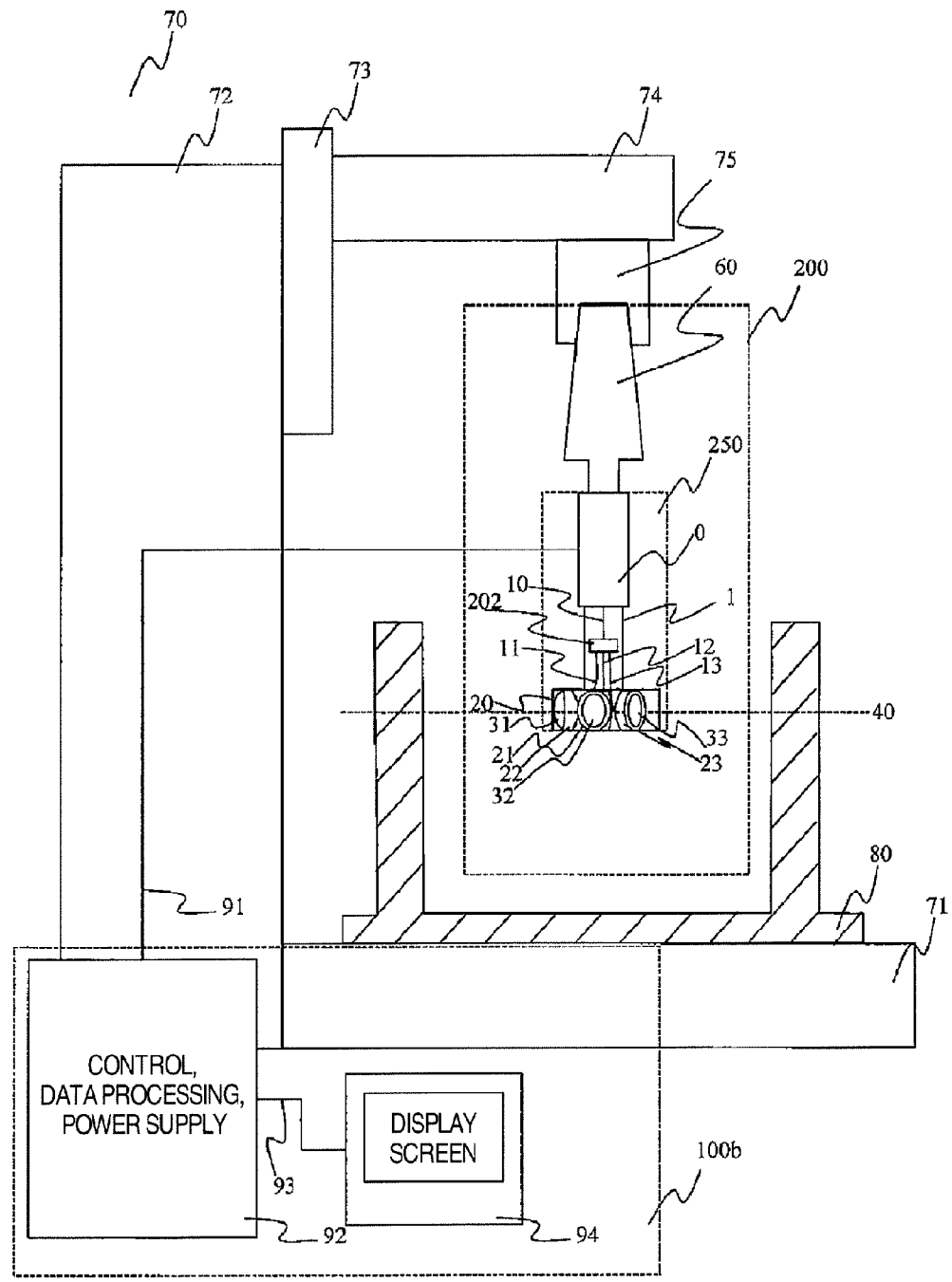
FIG. 8 is an example of a block diagram showing an inner surface shape measuring device 200 according to EMBODIMENT 2.

FIG. 8 is an example of a block diagram showing an inner surface shape measuring device 200 according to EMBODIMENT 2.

Figure 9:
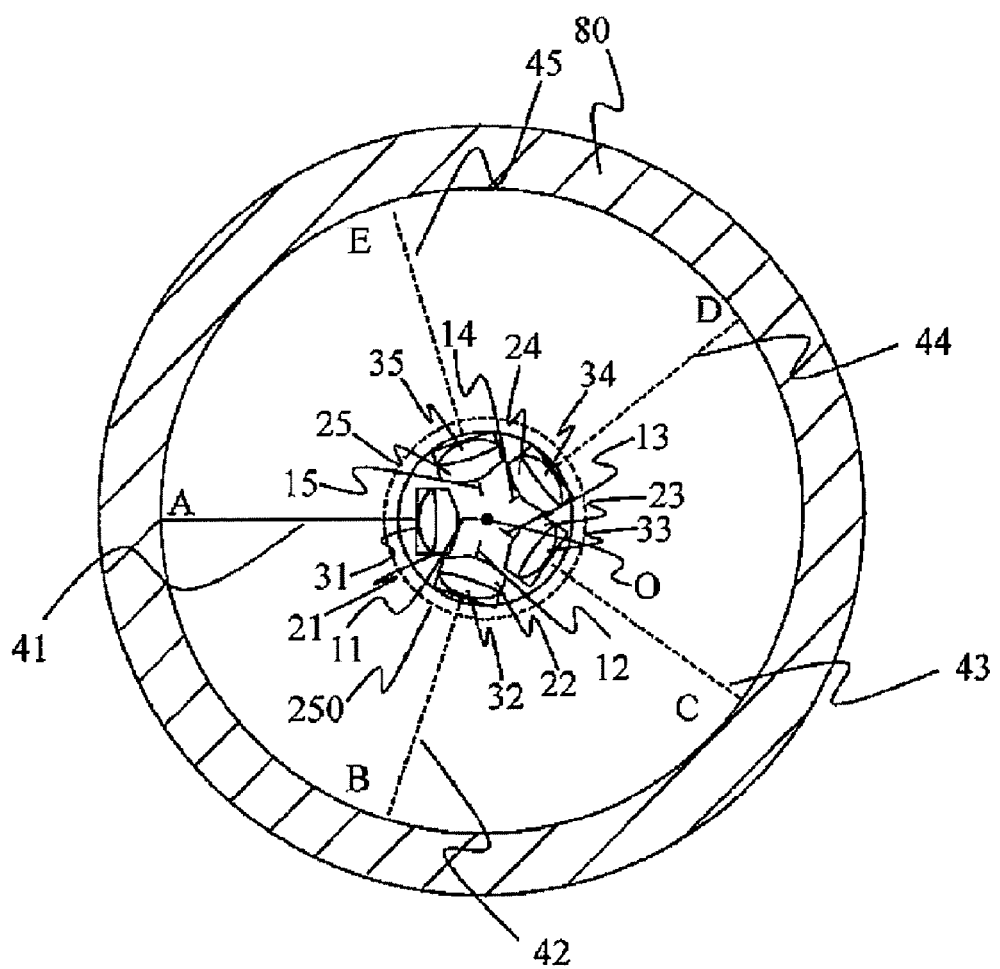
FIG. 9 is a sectional view on plan surface 40 of FIG. 8.

FIG. 9 is a sectional view on plan surface 40 of FIG. 8. Description of parts having the same function as configurations denoted by the same reference numbers shown in FIGS. 1 to 2, already described is omitted.

Collimator lens mounter adaptors 21 to 25 mounted with lenses 31 to 35 are disposed in different directions. The center of collimator lens mounter adaptors 21 to 25 is denoted by O, and points where output light beams 41 to 45 of optical fibers 11 to 15 fall on a pipe body are denoted by A, B, C, D and E.

Optical switch 202 plays a role in determining which of optical fibers 11 to 15 is connected to optical fiber 10.

A method of calculating distances a, b, c, d and e of OA, OB, OC, OD and OE is described. It is assumed that a destination of connection with optical fiber 10 selected by optical switch 2 is optical fiber 11, similarly to EMBODIMENT 1. An output light beam from distance sensor 0 is guided to optical switch 2 by optical fiber 10. Optical switch 2 guides this light beam to optical fiber 11, and applies the light beam to the inner surface of pipe body 80 through lens 31. A reflected light beam from pipe body 80 is detected by distance sensor 0 after passes through lens 31, optical fiber 11, optical switch 2, and optical fiber 10 and is converted into an electric signal, then signal processing circuit 91*d* calculates a distance a of OA via signal transmission line 91*c*.

Similarly, assuming that the destination of connection with optical fiber 10 selected by optical switch 2 is optical fiber 12, distance c of OB is calculated. Additionally, assuming that the destination of connection with optical fiber 10 selected by optical switch 2 is optical fiber 13, distance c of OC is calculated. Additionally, assuming that the destination of connection with optical fiber 10 selected by optical switch 2 is optical fiber 14, distance d of OD is calculated. Additionally, assuming that the destination of connection with optical fiber 10 selected by optical switch 2 is optical fiber 15, distance e of OE is calculated.

AngleAOB, AngleBOC, AngleCOD, AngleDOE, AngleEOA are default values, and therefore measurement results a, b, c, d and e are converted to rectangular coordinates on plan surface 40, and a coefficient of a general expression of an ellipse can be determined.

$$Ax^2+Bxy+Cy^2+Dx+Ey+1=0 \qquad (1)$$

According to this embodiment, in a case where an object to be measured is the inner surface of an elliptical pipe body, a minor axis and a major axis of the ellipse can be measured by measuring distances to the five measuring points.

EMBODIMENT 3

This embodiment describes an example of an inner surface shape measuring device in which an error due to inclination of the central axes of pipe body 80 and an inner surface shape measuring device is reduced.

Figure 10:
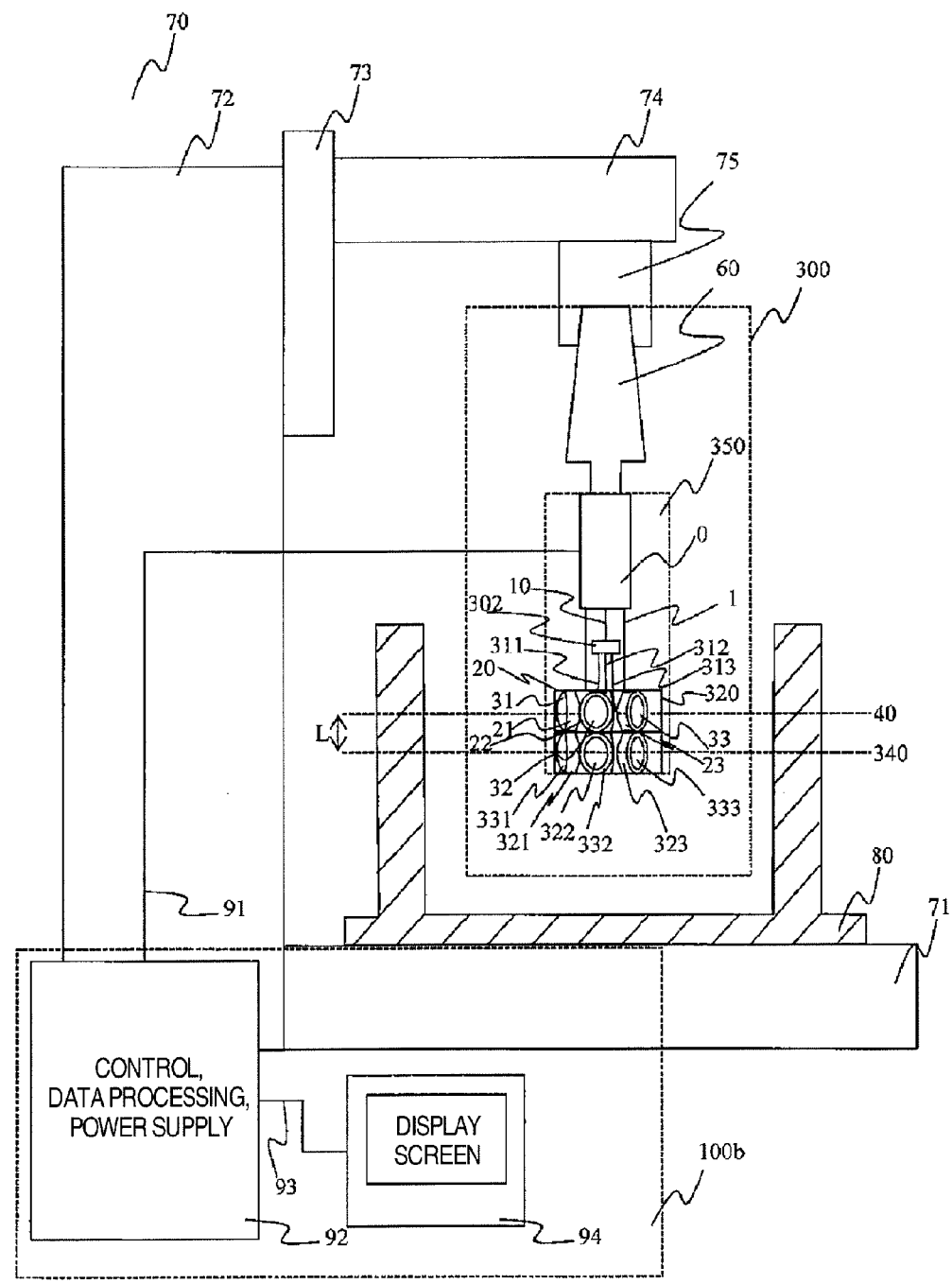
FIG. 10 is an example of a block diagram showing an inner surface shape measuring device 300 according to EMBODIMENT 3.
Figure 11:
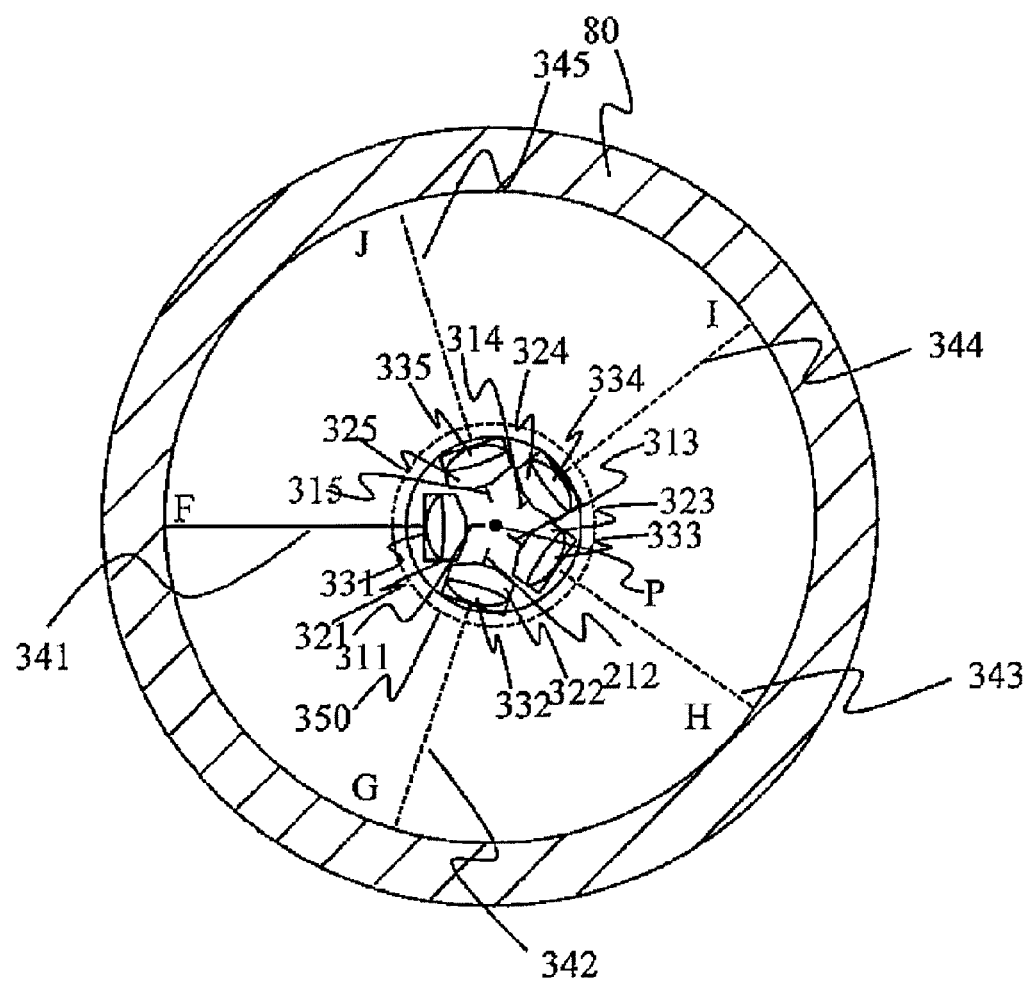
FIG. 11 is a sectional view on plan surface 340 of FIG. 10.

FIG. 10 is an example of a block diagram showing an inner surface shape measuring device 300 according to EMBODIMENT 3. FIG. 11 is a sectional view on plan surface 340 of FIG. 10. Description of parts having the same function as configurations denoted by the same reference numbers shown in FIGS. 1 to 9, already described is omitted.

Collimator lens mounter adaptors 321 to 325 mounted with lenses 331 to 335 are disposed in different directions. The center of the collimator lens mounter adaptors 321 to 325 is denoted by P, and points where output light beams 341 to 345 of optical fibers 311 to 315 fall on a pipe body are denoted by F, G, H, I and J.

Optical switch 302 plays a role in determining which of optical fibers 11 to 15 or optical fibers 311 to 315 is connected to optical fiber 10.

A method of calculating distances f, g, h, i and j of PF, PG, PH, PI and PJ is described. It is assumed that a destination of connection with optical fiber 10 selected by optical switch 302 is optical fiber 311, similarly to EMBODIMENTS 1 and 2. An output light beam from distance sensor 0 is guided to optical switch 302 by optical fiber 10. Optical switch 2 guides this light beam to optical fiber 311, and applies the light beam to the inner surface of pipe body 80 through lens 331. A reflected light beam from pipe body 80 is detected by distance sensor 0 after passes through lens 331, optical fiber 311, optical switch 302, and optical fiber 10 and is converted into an electric signal, then signal processing circuit 91*d* calculates distance f of PF via signal transmission line 91*c*.

Similarly, assuming that the destination of connection with optical fiber 10 detected by optical switch 302 is optical fiber 312, distance g of PG is calculated. Additionally, assuming that the destination of connection with optical fiber 10 selected by optical switch 2 is optical fiber 313, distance h of PH is calculated. Additionally, assuming that the destination of connection with optical fiber 10 selected by optical switch 2 is optical fiber 314, distance i of PI is calculated. Additionally distance j of PJ is calculated assuming that the destination of connection with optical fiber 10 selected by optical switch 2 is optical fiber 315.

AngleFOG, AngleGOH, AngleHOI, AngleIOJ, AngleJOF are default values, and therefore measurement results f, g, h, i and j are converted to rectangular coordinates on plan surface 340, and a coefficient of a general expression (1) of an ellipse can be determined.

Figure 12:
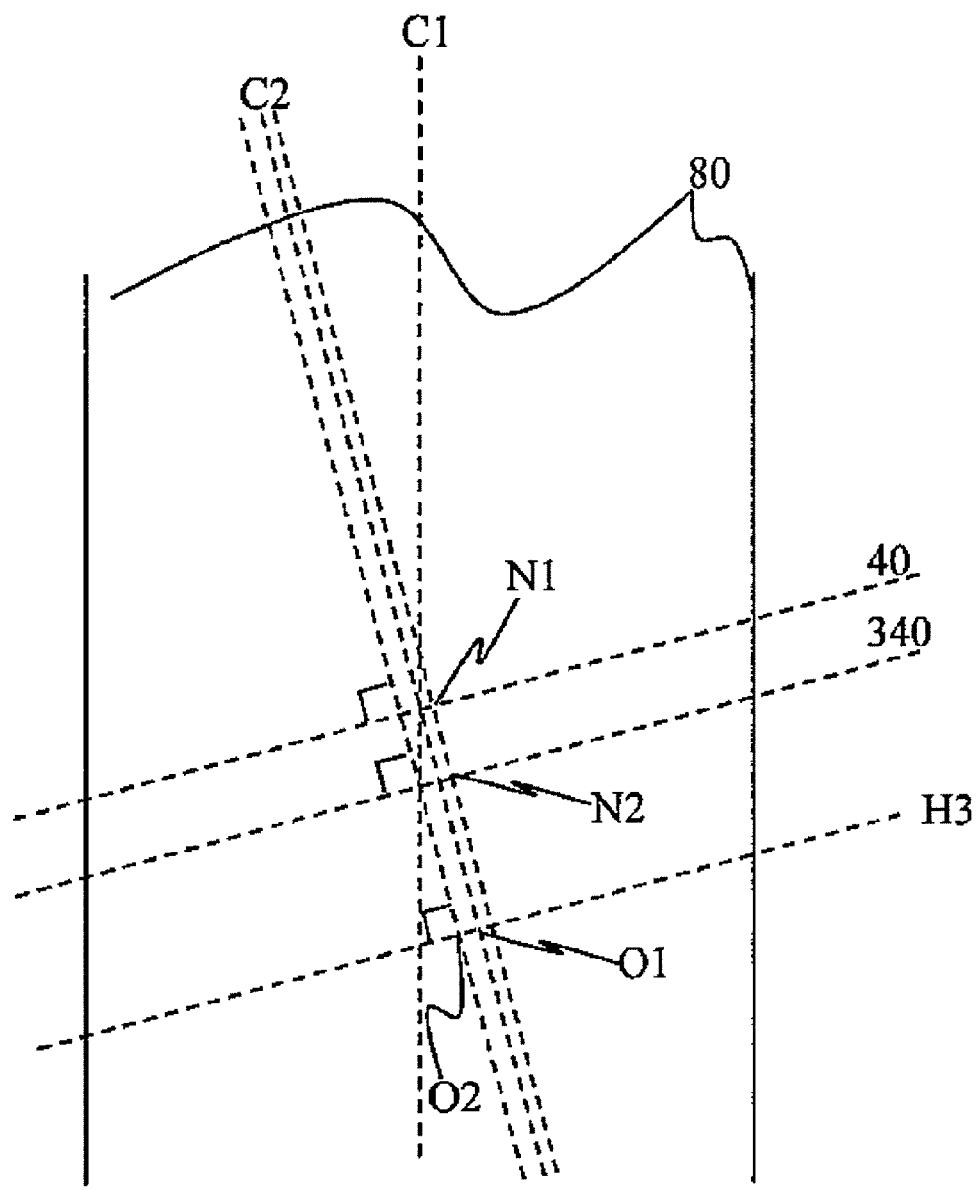
FIG. 12 is an example of a schematic diagram showing relation between the inner surface shape measuring device and pipe body 80 in a case where the central axes are inclined.

FIG. 12 is an example of a schematic diagram showing relation between the inner surface shape measuring device and pipe body 80 in a case where the central axes are inclined.

Description of parts having the same function as configurations denoted by the same reference numbers shown in FIGS. 1 to 10, already described is omitted.

Figure 13:
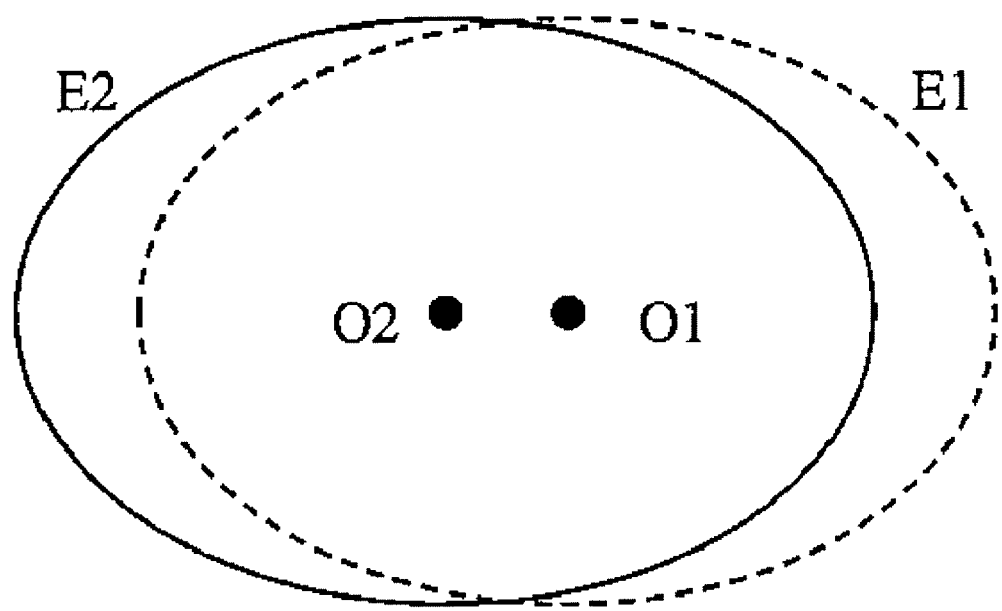
FIG. 13 is an example of a schematic diagram in a case where a measurement result is projected onto plan surface H3 of FIG. 12.

When central axis C1 of pipe body 80 and central axis C2 of the inner surface shape measuring device are inclined, a measurement result shows an ellipse also in a case where pipe body 80 is a perfect circle. At this time, in a case where the measurement result is projected onto plan surface H3, center point O1 of ellipse E1 on plan surface 40 and center O2 of ellipse E2 on plan surface 340 are located at different positions, as shown in FIG. 13.

Distance L between intersection point N1 of plan surface 40 and central axis C2 and intersection point N2 of plan surface 340 and central axis C2 is an default value, and therefore inclination of the central axis can be obtained from a distance ΔC between O1 and O2 by following expression (2).

$$\theta = \arcsin(\Delta C/L) \qquad (2)$$

The equation of an ellipse is corrected by using positional relation between plan surface 40 and plan surface 340, positional relation between O1 and O2, and inclination θ between the central axes, so that the inner surface shape of a pipe body in which influence of the inclination of the central axes is reduced can be obtained. Therefore, it is possible to measure the inner surface shape of pipe body 80 with high precision without adjusting the inclination of the central axes of inner diameter measuring device 300 and pipe body 80, thereby facilitating installation.

According to this embodiment, the inner diameter of the pipe body can be calculated by measuring the distances to five measuring points, obtaining inclination of the central axes and correcting the equation of an ellipse even in a case where the object to be measured is the inner surface of a circular pipe body, the central axis of the measuring head, the central axis and the pipe body are set in an inclined state.

EMBODIMENT 4

This embodiment describes an example of a shape measuring device for a pipe body inner surface.

Figure 14:
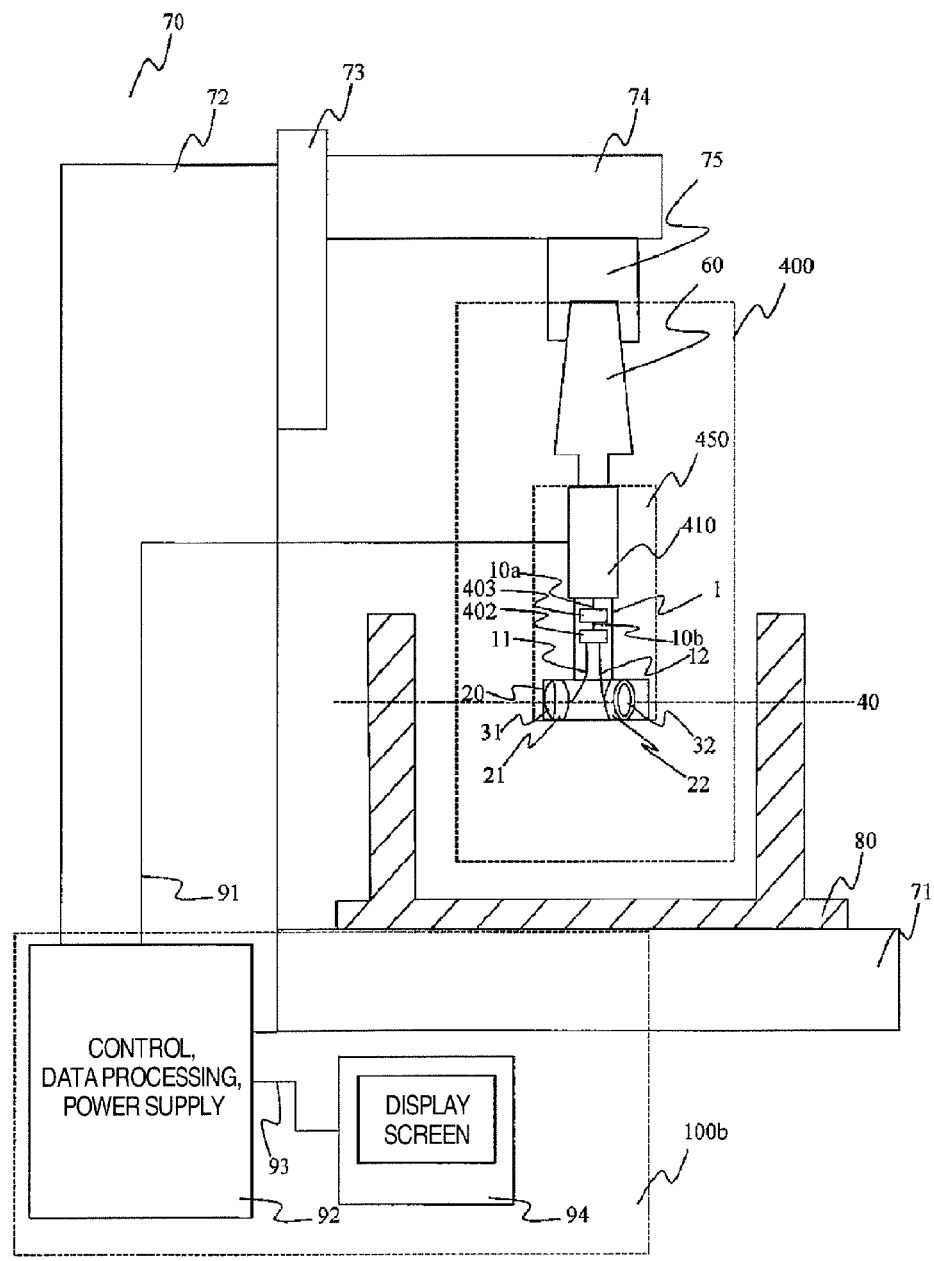
FIG. 14 is an example of a block diagram showing inner surface shape measuring device 400 according to EMBODIMENT 4.

FIG. 14 is an example of a block diagram showing inner surface shape measuring device 400 according to EMBODIMENT 4. Description of parts having the same function as configurations denoted by the same reference numbers shown in FIGS. 1 to 10 already described is omitted.

Distance sensor 410 applies a laser, and calculates distance from the reflected light beam. Distance sensor 410 can measure with light beams having different wavelength by using AWG 402 for separating to each light wavelength and outputting light beams, and wavelength variable filter 403 for selecting a wavelength allowing transmission, and can guide an irradiated light beam and a detected light beam by the same optical fiber. The distance measurement method is not limited.

Figure 15:
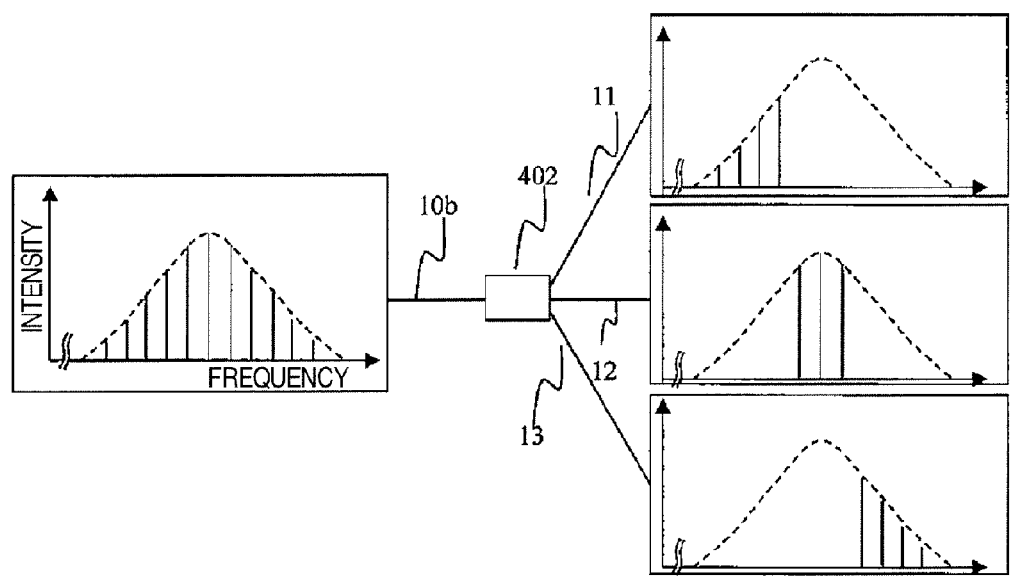
FIG. 15 is an example of a schematic diagram of operation of AWG (Array Waveguide Gratings).

FIG. 15 is an example of a schematic diagram of operation of AWG (Array Waveguide Gratings). AWG 402 divides a light beam into wavelength bands and outputs light beams of each wavelength band to optical fibers 11 to 13, and integrates the respective light beams in the different wavelength bands, which are input from optical fibers 11 to 13 and outputs to optical fiber 10.

Optical fiber 10a connects distance sensor 0 and wavelength variable filter 403, and optical fiber 10b connects wavelength variable filter 403 and AWG 402. Wavelength variable filter 403 can select a wavelength band which can pass through. Herein, a separating unit (branch point) that separates a measurement light beam into a plurality of measuring points exists in AWG 402. Additionally, AWG 402 functions as a selecting unit for selecting which of a plurality of measurement light beams is to be irradiated to a measuring point, corresponding to the wavelength band selected by wavelength variable filter 403.

A method of calculating distances a, b and c of OA, OB and OC is described. It is assumed that a transmission wavelength band of wavelength variable filter 403 is a band separated in optical fiber 11. An output light beam from distance sensor 0 is input to wavelength variable filter 403 by optical fiber 10a, is guided to AWG 402 by optical fiber 10b, passes through a lens 31, and is irradiated to the inner surface of pipe body 80. A reflected light beam from pipe body 80 passes through lens 31, optical fiber 11, AWG 402, wavelength variable filter 403, and optical fiber 10 and is detected by distance sensor 410 then the distance a of OA is calculated.

Similarly, distance b of OB is calculated assuming that the transmission wavelength band of wavelength variable filter 403 is a band separated in optical fiber 12. Additionally, distance c of OC is calculated assuming that the transmission wavelength band of wavelength variable filter 403 is a band separated in optical fiber 13.

According to this embodiment, AWG 402 and wavelength variable filter 403 can automatically select separation of a measurement light beam into a plurality of the measuring points and selection regarding to which measuring point the measurement light beam is to be irradiated by, thereby facilitating control.

EMBODIMENT 5

This embodiment explains an example of a shape measuring device for a pipe body inner surface which can lower device cost by associating measuring points and distance measurement results and reducing the number of component.

Figure 16:
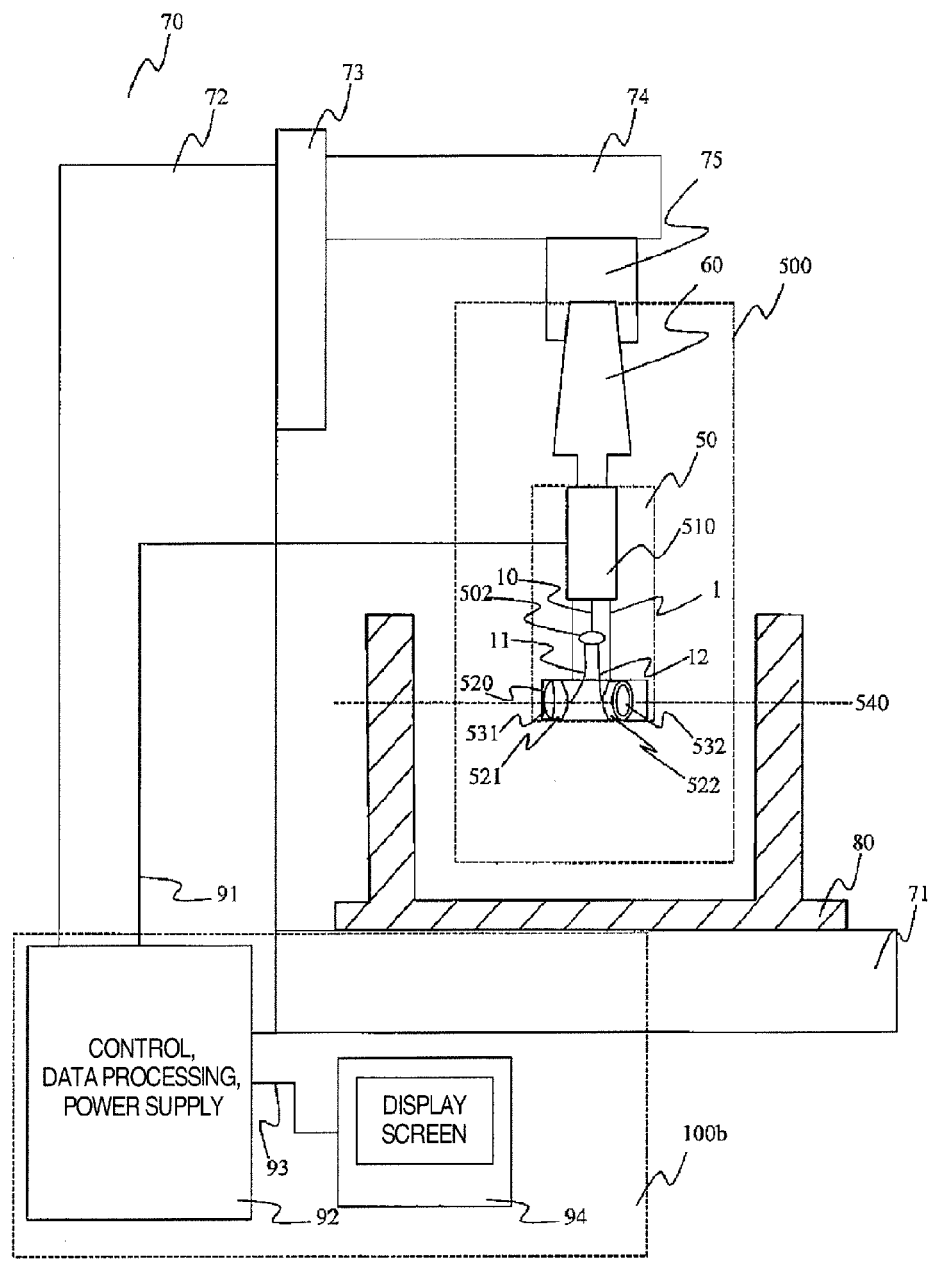
FIG. 16 is an example of a block diagram showing inner surface shape measuring device 500 according to EMBODIMENT 5.

FIG. 16 is an example of a block diagram showing inner surface shape measuring device 500 according to EMBODIMENT 5.

Description of parts having the same function as configurations denoted by the same reference numbers shown in FIGS. 1 to 14, already described is omitted.

Figure 17:
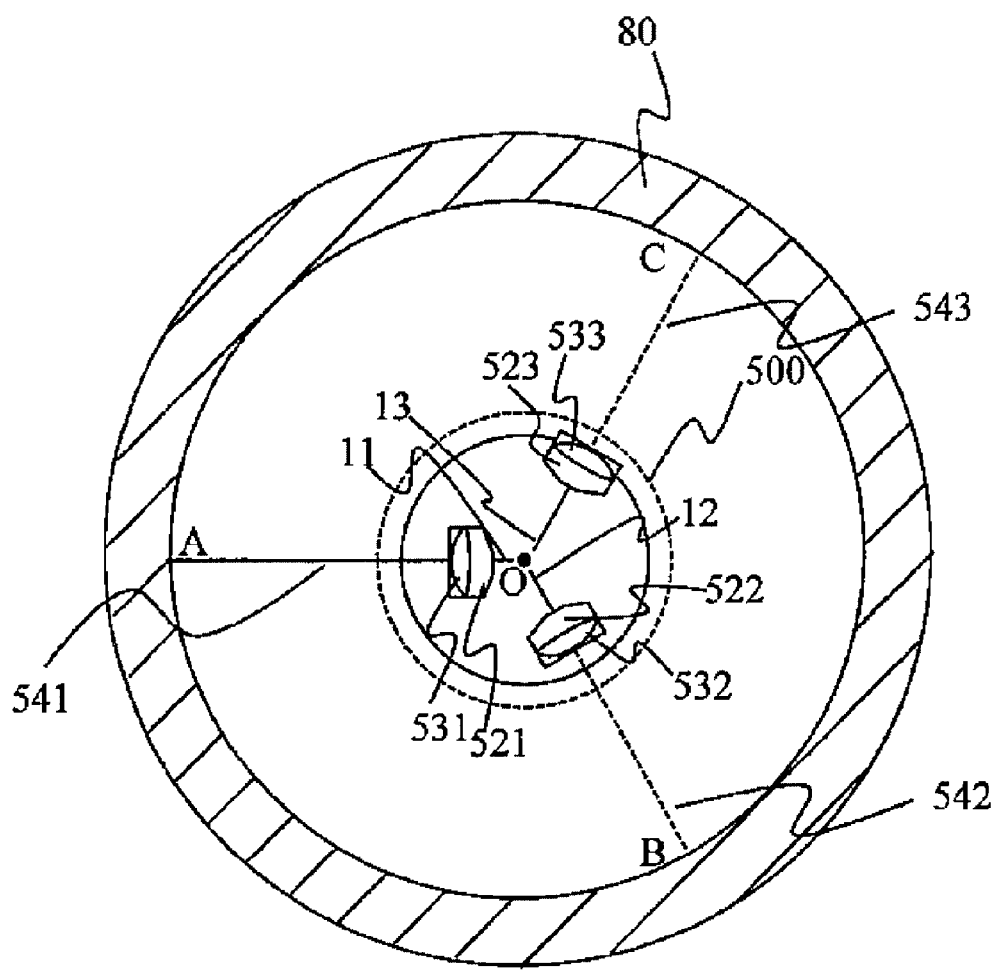
FIG. 17 is a sectional view on 540 of FIG. 16.

FIG. 17 is a sectional view on 540 of FIG. 16.

Distance sensor 510 applies a laser, and calculates distance from the reflected light beam. As long as the distance measurement method is a method capable of observing signals from different distances at the same time, the distance measurement method is not limited. Example of the distance measurement method includes a TOF method, a FMCW method, and the like.

In the TOF method, signals of different distances can be separated by time. In the FMCW method, signals of different distances can be separated by frequencies.

Optical fiber coupler 502 outputs a light beam that passes through optical fiber 10, divides the light beam into light beams to output the light beams to optical fibers 11 to 13, and integrates the light beams output from optical fibers 11 to 13 to output an integrated light beam to optical fiber 10.

Collimator lens mounter adaptors 521 to 523 mounted with lenses 531 to 533, each of which serves as an interference system for interfering a measurement light beam with a reflected light beam, are disposed in different directions such that respective distances from point O are made different by about 1 cm. The inner surface shape measuring device 500 is disposed such that distance between the center of the inner surface shape measuring device 500 and the center of pipe body 80 is about 1 cm or less.

That is, respective distances from point O (or separating unit) to lenses 531 to 533, each of which serves as an interference system for interfering a measurement light beam with a reflected light beam, are made different, so that distances a, b and c from lens 531 to 533 to measuring points A, B and C can be intentionally made different by a sufficiently large amount (about 1 cm). Consequently, the measuring points A, B and C can be associated with the measurement results a, b and c.

According to this embodiment, the measuring points are associated with the distance measurement results, so that the number of components can be reduced, and a device cost can be lowered.

The present invention is not limited to the above embodiments, but includes various modifications. For example, the above embodiments describe the present invention in detail in order to facilitate the understanding of the present invention, and are not necessarily limited to those including all the configurations described above. A part of the configuration of a certain embodiment can be replaced by the configuration of another embodiment, or the configuration of another embodiment can be added to the configuration of a certain embodiment. As to a part of the configuration of each embodiment, other configuration can be added, deleted, or replaced.

REFERENCE SIGNS LIST

100 Shape measuring device for pipe body inner surface
0 Distance sensor
2 Optical switch
50 Measuring head
70 Working machine
80 Pipe body

The invention claimed is:

1. A shape measuring device for measuring a shape of an object to be measured comprising:
   a distance sensor that applies a measurement light beam to the object to be measured, detects a reflected light beam from the object to be measured, and calculates a distance to the object to be measured;
   a light splitter that comprises a plurality of collimator lens mount adaptors, each of the plurality of collimator lens mount adaptors being directly coupled to a respective optical fiber such that each lens mount adaptor is between the respective optical fiber and a corresponding lens, the light splitter being configured to divide the measurement light beam from the distance sensor into a plurality of measurement light beams to be irradiated to a plurality of measuring points; and a selector that comprises an optical switch that is configured to determine, from the plurality of measurement light beams, a measurement light beam to irradiate to the object to be measured.

2. The shape measuring device according to claim 1, wherein the distance sensor detects respective reflected light beams from the object to be measured, corresponding to the plurality of measurement light beams, and calculates respective distances to the plurality of measuring points.

3. The shape measuring device according to claim 1, comprising a calculating unit that calculates shape data of the object to be measured from the distances to the plurality of measuring points calculated by the distance sensor.

4. The shape inspection device according to claim 1, wherein an electric variable focus lens is configured to change a focus position that is provided between the light splitter and the object to be measured.

5. The shape measuring device according to claim 1, wherein the light splitter separates the measurement light beam from the distance sensor into three light beams.

6. The shape measuring device according to claim 1, wherein the light splitter separates the measurement light beam from the distance sensor into five light beams.

7. The shape measuring device according to claim 1, wherein a plurality of interference systems, each of which interferes a measurement light beam with a reflected light beam, are provided corresponding to the respective measuring points, and respective distances between the plurality of interference systems and the light splitter are made different.

8. A shape measuring method comprising:
separating, by a light splitter that comprises a plurality of collimator lens mount adaptors, each of the plurality of collimator lens mount adaptors being directly coupled to a respective optical fiber such that each lens mount adaptor is between the respective optical fiber and a corresponding lens, the light splitter separating a measurement light beam irradiated from a distance sensor into a plurality of measurement light beams;

selecting, by an optical switch, one of the measurement light beams from the plurality of measurement light beams;

irradiating the selected measurement light beam to a corresponding measuring point;

detecting, using the distance sensor, a reflected light beam from the measuring point for each measuring point; and calculating distance from the reflected light beam to each measuring point to measure a shape of an object to be measured.

9. The shape measuring method according to claim 8, comprising calculating shape data of the object to be measured from the distances to the respective measuring points.

10. The shape measuring method according to claim 8, wherein the measurement light beam irradiated from the distance sensor is separated into three light beams.

11. The shape measuring method according to claim 8, wherein the measurement light beam irradiated from the distance sensor is separated into five light beams.

12. The shape measuring method according to claim 8, wherein any of the plurality of measurement light beams is selected by a wavelength band of the measurement light beam irradiated from the distance sensor.

* * * * *